United States Patent
Wang et al.

(10) Patent No.: US 11,855,277 B2
(45) Date of Patent: Dec. 26, 2023

(54) COMPOSITE POSITIVE-ELECTRODE MATERIAL AND PREPARATION METHOD THEREOF, POSITIVE-ELECTRODE PLATE, SECONDARY BATTERY, AND BATTERY MODULE, BATTERY PACK, AND APPARATUS CONTAINING SUCH SECONDARY BATTERY

(71) Applicant: CONTEMPORARY AMPEREX TECHNOLOGY CO., LIMITED, Ningde (CN)

(72) Inventors: Bangrun Wang, Ningde (CN); Na Liu, Ningde (CN); Chengdu Liang, Ningde (CN); Yongchao Liu, Ningde (CN); Xin Sun, Ningde (CN); Haotian Xie, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/971,500

(22) Filed: Oct. 21, 2022

(65) Prior Publication Data

US 2023/0261178 A1    Aug. 17, 2023

Related U.S. Application Data (63) Continuation of application No. PCT/CN2020/131578, filed on Nov. 25, 2020.

(51) Int. Cl.
| | | |
|---|---|---|
| H01M 4/36 | (2006.01) | |
| H01M 4/04 | (2006.01) | |
| H01M 4/485 | (2010.01) | |
| H01M 4/505 | (2010.01) | |
| H01M 4/525 | (2010.01) | |
| H01M 4/58 | (2010.01) | |
| H01M 4/02 | (2006.01) | |

(52) U.S. Cl.
CPC ......... *H01M 4/366* (2013.01); *H01M 4/0404* (2013.01); *H01M 4/485* (2013.01); *H01M 4/505* (2013.01); *H01M 4/525* (2013.01); *H01M 4/5825* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 10,199,649 B2 | 2/2019 | Beek et al. | |
| 2015/0311522 A1* | 10/2015 | Fang | ...................... C01G 53/50 427/126.3 |
| 2020/0328406 A1 | 10/2020 | Yang et al. | |

FOREIGN PATENT DOCUMENTS

| | | |
|---|---|---|
| CN | 104157831 A | 11/2014 |
| CN | 103718351 B | 8/2016 |
| CN | 107968195 A | 4/2018 |
| CN | 109428050 A | 3/2019 |
| CN | 110212167 A | 9/2019 |
| CN | 110299515 A | 10/2019 |
| CN | 110459748 A | 11/2019 |
| CN | 112054166 A | 12/2020 |
| JP | 2017130359 A | 7/2017 |

OTHER PUBLICATIONS

International Search Report and Written Opinion, PCT/CN2020/131578, dated Aug. 23, 2021, 14 pgs.
GB/T, "Particle size analysis-Laser diffraction methods," ICS 19.120, A 28, GB/T 19044-2016/ISO 13320:2009, Feb. 24, 2016, 47 pgs.
Xin Su, "A new strategy to mitigate the initial capacity loss of lithium ion batteries," Elsevier, Journal of Power Sources 324 (2016) 150-157, 8 pgs.
The European Patent Office (EPO) The Extended Search Report for EP Application No. 20962777.7 dated Jun. 29, 2023 8 Pages.

* cited by examiner

*Primary Examiner* — Carlos Barcena
(74) *Attorney, Agent, or Firm* — ANOVA LAW GROUP, PLLC (57) ABSTRACT

This application provides a composite positive-electrode material and a preparation method thereof, a positive-electrode plate, a secondary battery, and a battery module, a battery pack, and an apparatus containing such secondary battery. The composite positive-electrode material includes a core and a coating layer covering at least part of a surface of the core, where the core includes a positive-electrode pre-lithiation material, the positive-electrode pre-lithiation material includes a lithium-rich metal oxide, and the coating layer includes a positive-electrode active material.

11 Claims, 6 Drawing Sheets

COMPOSITE POSITIVE-ELECTRODE MATERIAL AND PREPARATION METHOD THEREOF, POSITIVE-ELECTRODE PLATE, SECONDARY BATTERY, AND BATTERY MODULE, BATTERY PACK, AND APPARATUS CONTAINING SUCH SECONDARY BATTERY

CROSS-REFERENCE TO RELATED APPLICATION

This application is a continuation application of PCT Patent Application No. PCT/CN2020/131578, entitled "COMPOSITE POSITIVE ELECTRODE MATERIAL AND PREPARATION METHOD THEREFOR, POSITIVE ELECTRODE PLATE, SECONDARY BATTERY AND BATTERY MODULE COMPRISING SAME, BATTERY PACK, AND DEVICE" filed on Nov. 25, 2020, which is incorporated herein by reference in its entirety.

TECHNICAL FIELD

This application relates to the field of energy storage apparatus technologies, and specifically, to a composite positive-electrode material and a preparation method thereof, a positive-electrode plate, a secondary battery, and a battery module, a battery pack, and an apparatus containing such secondary battery.

BACKGROUND

In recent years, with application and promotion of secondary batteries in industries such as various electronic products and new energy vehicles, the energy density of the secondary battery has received increasing attention. However, during first-time charging and discharging of the secondary battery, a SEI (solid electrolyte interface, solid electrolyte interface) film is inevitably formed at the negative electrode, resulting in consumption of active ions. Such irreversible capacity loss is difficult to eliminate, bringing challenges to improvement of the energy density of the secondary battery.

SUMMARY

A first aspect of this application provides a composite positive-electrode material, which includes a core and a coating layer covering at least part of a surface of the core, where the core includes a positive-electrode pre-lithiation material, the positive-electrode pre-lithiation material includes a lithium-rich metal oxide, and the coating layer includes a positive-electrode active material.

In this application, the surface of the positive-electrode pre-lithiation material is coated by the positive-electrode active material, so as to isolate external environment, improve stability of the material, and ensure purity of the material and pre-lithiation performance. In addition, the coating layer with the positive-electrode active material is a good lithium ion conductor, and can greatly improve efficiency of pre-lithiation. Therefore, the composite positive-electrode material of this application can effectively compensate for active lithium that is lost during first-time charging and discharging of the battery, and improve a first-time charging-discharging capacity of the battery, thereby improving an energy density. Further, coating the positive-electrode pre-lithiation material by using the positive-electrode active material may not introduce any additional inactive substances, so that the battery obtains a higher energy density. Further, with the composite positive-electrode material of this application, a cycle life of the battery is also significantly prolonged.

In any implementation of this application, in the composite positive-electrode material, the positive-electrode active material is distributed on the surface of the core in a form of independent particles. When the composite positive-electrode material satisfies the above conditions, the battery using the composite positive-electrode material can implement a higher energy density and better cycling performance.

In any implementation of this application, in the composite positive-electrode material, a mass ratio of the positive-electrode pre-lithiation material to the positive-electrode active material is 1:2-1:35, in some embodiments, 1:5-1:30, and in some other embodiments 1:10-1:20. When the mass ratio of the positive-electrode pre-lithiation material to the positive-electrode active material falls within the foregoing range, the battery can implement a relatively high energy density and better cycling performance.

In any implementation of this application, the median particle size $D_v50$ of the positive-electrode pre-lithiation material is 2 μm-35 μm, in some embodiments 5 μm-30 μm, and in some other embodiments 15 μm-25 μm. The positive-electrode pre-lithiation material with $D_v50$ being within an appropriate range can improve a capacity utilization rate of the positive-electrode pre-lithiation material, and further improve the energy density and cycling performance of the battery.

In any implementation of this application, a median particle size $D_v50$ of the positive-electrode active material is 0.1 μm-15 μm, in some embodiments 0.2 μm-10 μm, and in some other embodiments 0.5 μm-6 μm. The positive-electrode active material with $D_v50$ being within an appropriate range can further improve the energy density and cycling performance of the battery.

In any implementation of this application, the lithium-rich metal oxide is selected from one or more of $Li_2M^1O_2$, $Li_2M^2O_3$, $Li_3M^3O_4$, $Li_5M^4O_4$, and $Li_6M^5O_4$; where $M^1$ includes one or more of Ni, Co, Fe, Mn, Zn, Mg, Ca, and Cu; $M^2$ includes one or more of Mn, Sn, Mo, Ru, and Ir; $M^3$ includes one or more of V, Nb, Cr, and Mo; $M^4$ includes one or more of Fe, Cr, V, and Mo; $M^5$ includes one or more of Co, V, Cr, and Mo; and a valence state of each metal element other than Li in the lithium-rich metal oxide is lower than its own highest oxidation valence state.

In any implementation of this application, the lithium-rich metal oxide is selected from one or more of $Li_3VO_4$, $Li_2MnO_2$, $Li_3NbO_4$, $Li_5FeO_4$, $Li_6CoO_4$, $Li_2NiO_2$, $Li_2CuO_2$, and $Li_2Cu_{x1}Ni_{1-x1-y1}M_{y1}O_2$, where $0<x1<1$, $0 \leq y1<0.1$, and M is selected from one or more of Zn, Sn, Mg, Fe, and Mn. In some embodiments, $0.2 \leq x1 \leq 0.8$. In some other embodiments, $0.5 \leq x1 \leq 0.7$.

In any implementation of this application, the positive-electrode active material may be selected from one or more of layered lithium transition metal oxide, spinel-structured lithium metal oxide, and polyanionic positive-electrode material. In some embodiments, the layered lithium transition metal oxide is selected from one or more of $LiCoO_2$, $LiNiO_2$, $LiMnO_2$, $LiNi_aCo_bMn_cO_2$, $LiNi_\alpha Co_\beta Al_\gamma O_2$ and modified materials thereof, where $0<a<1$, $0<b<1$, $0<c<1$, $a+b+c=1$, $0<\alpha<1$, $0<\beta<1$, $0<\gamma<1$, and $\alpha+\beta+\gamma=1$. In some embodiments, the spinel-structured lithium metal oxide is selected from one or more of $LiMn_2O_4$ and $LiNi_{0.5}Mn_{1.5}O_4$. In some embodiments, the polyanionic positive-electrode material is selected from one or more of $LiFePO_4$, LiMnPO$_4$, LiCoPO$_4$, LiNiPO$_4$, Li$_3$V$_2$(PO$_4$)$_3$, LiFe$_y$Mn$_{1-y}$PO$_4$, and modified materials thereof, where 0<y<1; in some embodiments, 0.2≤y≤0.8.

In any implementation of this application, the positive-electrode active material is selected from one or more of LiFePO$_4$, LiMnPO$_4$, Li$_3$V$_2$(PO$_4$)$_3$, and modified materials thereof.

In any implementation of this application, a charging cut-off voltage of the positive-electrode active material is 4.2V-5.2V (vs. Li/Li$^+$), and the lithium-rich metal oxide is selected from one or more of Li$_6$CoO$_4$, Li$_5$FeO$_4$, Li$_2$NiO$_2$, Li$_2$Cu$_{x1}$Ni$_{1-x1-y1}$M$_{y1}$O$_2$, Li$_3$VO$_4$, and Li$_3$NbO$_4$, where 0<x1<1, 0≤y1<0.1, M is selected from one or more of Zn, Sn, Mg, Fe, and Mn. In some embodiments, 0.1≤x1≤0.9. In some other embodiments, 0.2≤x1≤0.8. In some embodiments, the positive-electrode active material is selected from one or more of LiCoO$_2$, LiNi$_a$Co$_b$Mn$_c$O$_2$, LiNi$_\alpha$Co$_\beta$Al$_\gamma$O$_2$, LiMn$_2$O$_4$, LiNi$_{0.5}$Mn$_{1.5}$O$_4$, LiCoPO$_4$, LiNiPO$_4$, and modified materials thereof, where 0<a<1, 0<b<1, 0<c<1, a+b+c=1, 0<α<1, 0<β<1, 0<γ<1, and α+β+γ=1.

In some embodiments, the median particle size D$_v$50 of the positive-electrode active material is 1 µm-15 µm, in some other embodiments 2 µm-10 µm, and in yet some other embodiments 4 µm-6 µm. The positive-electrode active material with D$_v$50 being within the foregoing range can further improve the energy density and cycling performance of the battery.

In any implementation of this application, a charging cut-off voltage of the positive-electrode active material is 3.5V-4.2V (vs. Li/Li$^+$), and the lithium-rich metal oxide is selected from one or more of Li$_5$FeO$_4$, Li$_2$CuO$_2$, Li$_2$Cu$_{x1}$Ni$_{1-x1-y1}$M$_{y1}$O$_2$, and Li$_2$MnO$_2$, where 0<x1<1, 0≤y1<0.1, M is selected from one or more of Zn, Sn, Mg, Fe, and Mn. In some embodiments, 0.1≤x1 ≤0.9. In some other embodiments, 0.2≤x1 ≤0.8. In some embodiments, the positive-electrode active material is selected from one or more of LiFePO$_4$, Li$_3$V$_2$(PO$_4$)$_3$ and LiFe$_y$Mn$_{1-y}$PO$_4$, where 0<y<1. In some embodiments, 0.2≤y≤0.8.

In some embodiments, the median particle size D$_v$50 of the positive-electrode active material is 0.1 µm-3.5 µm, or 0.2 µm-2 µm, and in some other embodiments 0.5 µm-1.5 µm. The positive-electrode active material with D$_v$50 being within the foregoing range can further improve the energy density and cycling performance of the battery.

A second aspect of this application provides a preparation method of a composite positive-electrode material, which may further include the following steps:

providing a core, where the core includes a positive-electrode pre-lithiation material, and the positive-electrode pre-lithiation material includes a lithium-rich metal oxide;

providing a coating material, where the coating material includes a positive-electrode active material; and coating at least part of a surface of the core by using the coating material to obtain a composite positive-electrode material.

In the preparation method provided by this application, the surface of the positive-electrode pre-lithiation material is coated by the positive-electrode active material, so as to isolate external environment, improve stability of the material, and ensure purity of the material and pre-lithiation performance. In addition, the coating layer with the positive-electrode active material is a good lithium ion conductor, and can greatly improve efficiency of pre-lithiation. Therefore, the composite positive-electrode material obtained by using the preparation method of this application can effectively compensate for active lithium that is lost during first-time charging and discharging of the battery, and improve a first-time charging-discharging capacity of the battery, thereby improving the energy density. Further, coating the positive-electrode pre-lithiation material by using the positive-electrode active material may not introduce any additional inactive substances, so that the battery obtains a higher energy density. Further, with the composite positive-electrode material obtained by using the preparation method of this application, a cycle life of the battery is also significantly prolonged.

A third aspect of this application provides a positive-electrode plate. The positive-electrode plate includes a positive-electrode current collector and a positive-electrode film layer disposed on the positive-electrode current collector, where the positive-electrode film layer includes the composite positive-electrode material according to the first aspect of this application, or the composite positive-electrode material prepared by using the preparation method according to the second aspect of this application.

The positive-electrode plate of this application uses the composite positive-electrode material of this application; therefore, the secondary battery using the positive-electrode plate has a higher first-time charging-discharging capacity, a higher energy density, and better cycling performance.

In any implementation of this application, the positive-electrode film layer further includes a conductive agent and a binder; and based on a total weight of the positive-electrode film layer, the positive-electrode film layer includes 70 wt %-97 wt % of the composite positive-electrode material, 2 wt %-20 wt % of a conductive agent, and 1 wt %-25 wt % of a binder. The energy density and cycle life of the secondary battery can be further improved by adjusting a proportion of the composite positive-electrode material in the positive-electrode film layer.

A fourth aspect of this application provides a secondary battery. The secondary battery includes the positive-electrode plate in the third aspect of this application.

The secondary battery of this application using the positive-electrode plate of this application can have a higher first-time charging-discharging capacity, a higher energy density, and better cycling performance.

A fifth aspect of this application provides a battery module. The battery module includes the secondary battery in the fourth aspect of this application.

A sixth aspect of this application provides a battery pack. The battery pack includes the battery module in the fifth aspect of this application.

A seventh aspect of this application provides an apparatus. The apparatus includes at least one of the secondary battery in the fourth aspect of this application, the battery module in the fifth aspect of this application, or the battery pack in the sixth aspect of this application.

The battery module, the battery pack, and the apparatus in this application include the secondary battery in this application, and therefore have at least technical effects that are the same as or similar to those of the secondary battery.

DESCRIPTION OF EMBODIMENTS

In order to make the objectives, technical solutions and beneficial technical effects of this application clearer, the following describes this application in detail with reference to the specific embodiments. It should be understood that the embodiments described in this specification are merely intended to interpret this application, but not intended to limit this application.

For simplicity, only some numerical ranges are expressly disclosed in this specification. However, any lower limit can form an unspecified range together with any upper limit. Any lower limit can form an unspecified range with any other lower limit. Similarly, any upper limit can form an unspecified range with any other upper limit. In addition, although not expressly recorded, each point or individual value between endpoints of a range is included in the range. Therefore, each point or individual value may be used as its own lower or upper limit and combined with any other point or individual value or combined with any other lower limit or upper limit to form a range not expressly recorded.

In the description of this specification, it should be noted that, unless otherwise stated, "above" and "below" a number means the number included, and "more" in "one or more" means at least two.

In the description of this specification, unless otherwise stated, a term "or" indicates inclusion. That is, a phrase "A or B" means "A, B, or both A and B". More specifically, any of the following conditions satisfies the condition "A or B": A is true (or present) and B is false (or not present); A is false (or not present) and B is true (or present); or both A and B are true (or present).

The foregoing invention content of this application is not intended to describe each of the disclosed embodiments or implementations of this application. The following description illustrates exemplary embodiments in more detail by using examples. Throughout this application, guidance is provided in a series of embodiments and the embodiments may be used in various combinations. In the embodiments, enumeration is only representative but should not be interpreted as exhaustive.

In order to meet requirements of the secondary battery in terms of high energy density, a pre-lithiation technology can be used to increase a content of active lithium ions to compensate for active lithium loss during first-time charging and discharging of the secondary battery. At present, the main and relatively mature technology is a negative-electrode pre-lithiation process, for example, a lithium metal layer covers a surface of the negative electrode by using lithium powder or lithium foil. However, chemical properties of metallic lithium are very active, imposing relatively high requirements on environment and devices, and there are relatively high safety risks in the pre-lithiation process. Compared with negative-electrode pre-lithiation, the positive-electrode pre-lithiation process has higher safety performance and reduces environmental control requirements. The positive-electrode pre-lithiation process may be to add a lithium-rich transition metal oxide to a positive-electrode slurry to prepare a lithium-rich positive electrode. During battery formation or initial cycling, a lithium-rich material of the positive electrode releases lithium to compensate for irreversible loss of active lithium caused by a SEI film formed on the negative electrode.

However, the lithium-rich transition metal oxide still has higher activity, and easily reacts with moisture and carbon dioxide in the environment, reducing pre-lithiation effects. In addition, impurities introduced during reaction can also decrease the energy density of the battery. The inventor has further found that coating the lithium-rich transition metal oxide by using carbon material or metal oxide (such as $Al_2O_3$, $TiO_2$, or $ZrO_2$) can isolate external environment and prevent the lithium-rich material from coming in contact with water and carbon dioxide in the air. However, the preparation process of the surface coating layer is complex, and especially a coating layer with non-electrochemical activity further decreases the energy density of the battery is further decreased. In addition, a conventional coating layer is not conducive to deintercalation of lithium ions from the pre-lithiation material, resulting in limited improvement in the cycle life of the battery.

Through in-depth research by the inventor, a composite positive-electrode material is provided for improving stability of the positive-electrode pre-lithiation material by using a coating layer with electrochemical activity. Based on this, the composite positive-electrode material of this application includes a core and a coating layer covering at least part of a surface of the core, where the core includes a positive-electrode pre-lithiation material, the positive-electrode pre-lithiation material includes a lithium-rich metal oxide, and the coating layer includes a positive-electrode active material.

The coating layer with electrochemical activity is a coating layer that has good ion conductivity and is able to provide a good lithium ion deintercalation channel during charging and discharging of the battery. Therefore, during charging of the battery, the coating layer can provide a good lithium ion deintercalation channel for the coated positive-electrode pre-lithiation material. The positive-electrode active material is a material, participating in intercalation and deintercalation of active ions, in the positive-electrode plate (which is an electrode plate with higher potential in the battery) during charging and discharging of the battery. The positive-electrode pre-lithiation material is usually provided at the positive electrode and can provide additional active lithium during first-time or initial charging of the battery. The positive-electrode pre-lithiation material can be used to compensate for irreversible loss of active lithium caused by the SEI film formed on the negative electrode.

The positive-electrode active material generally has good stability to moisture and carbon dioxide in the air. In this application, coating the surface of the positive-electrode pre-lithiation material by using the positive-electrode active material can play the role of isolating the external environment, avoid direct contact between the positive-electrode pre-lithiation material and the moisture and carbon dioxide in the air, and reduce side reaction on the surface, thereby improving stability of the material and ensuring purity of the material and pre-lithiation performance. The coating layer with the positive-electrode active material is a good lithium ion conductor, and is good for a delithiation process of the pre-lithiation material and greatly improves the pre-lithiation efficiency. Therefore, the composite positive-electrode material of this application can effectively compensate for active lithium that is lost during first-time charging and discharging of the battery, and improve a first-time charging-discharging capacity of the battery, so that the battery can obtain a relatively high energy density. Further, coating the positive-electrode pre-lithiation material by using the positive-electrode active material may not introduce any additional inactive substances, so that the battery obtains a higher energy density.

The composite positive-electrode material of this application can further significantly increase the cycle life of the battery. Absent from any theoretical restriction, the composite positive-electrode material improves a capacity utilization rate of the positive-electrode pre-lithiation material, allowing the positive-electrode pre-lithiation material to release more active lithium. Excessive active lithium is intercalated into the negative electrode, so that the negative-electrode active material is in a lithiation state to some extent. This can alleviate a volume change of the negative-electrode active material to some extent, thereby reducing a risk of breakage or powder falling of the negative-electrode active material. In addition, the negative-electrode plate maintains good electrolyte wettability and liquid retention rate. Such portion of active lithium can also be used in middle and later cycling phases to compensate for loss of active lithium during battery cycling. Therefore, using the composite positive-electrode material of this application can further prolong the cycle life.

Figure 1:
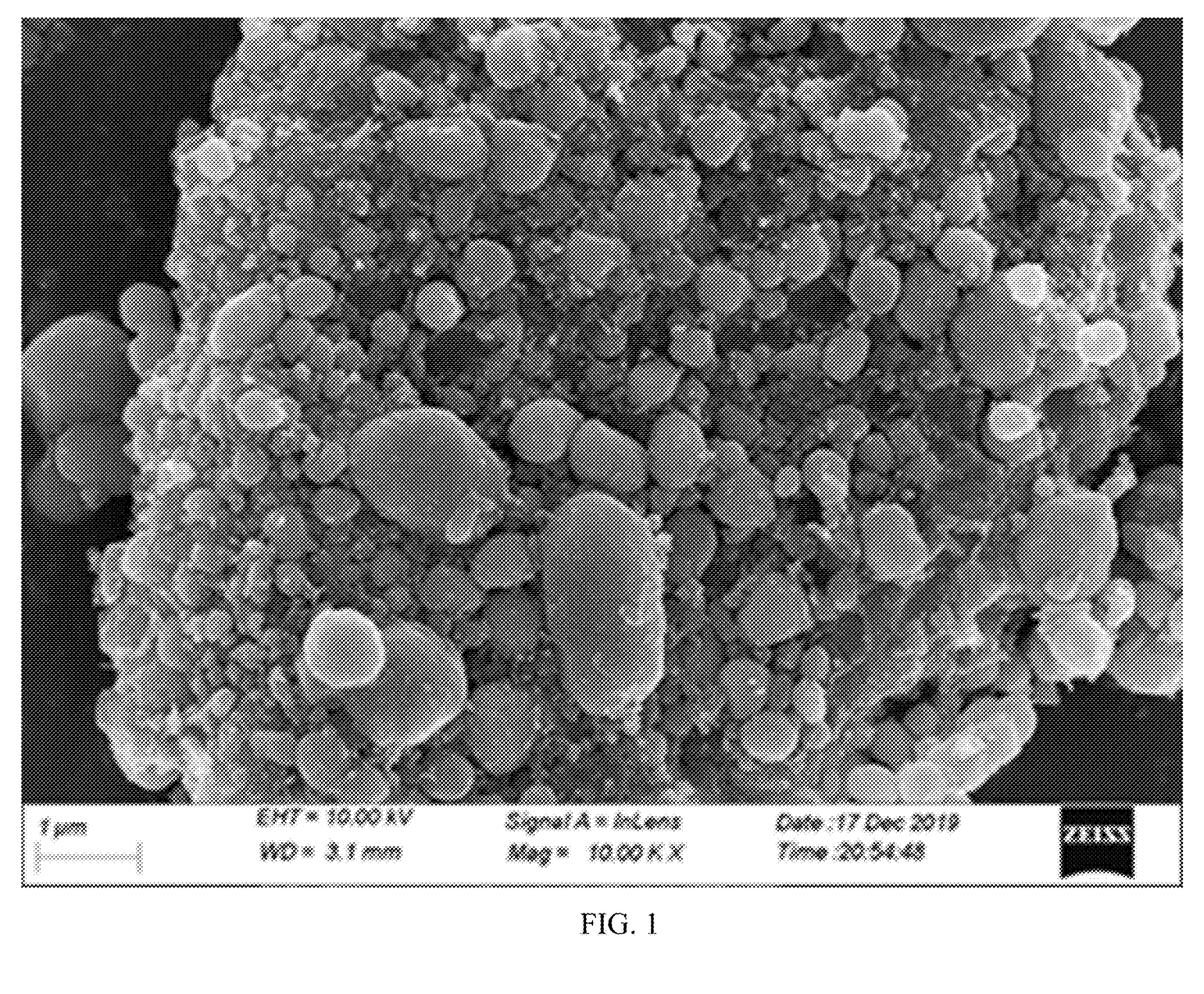
FIG. 1 is a scanning electron microscope (SEM) image of a composite positive-electrode material according to an embodiment of this application.
Figure 2:
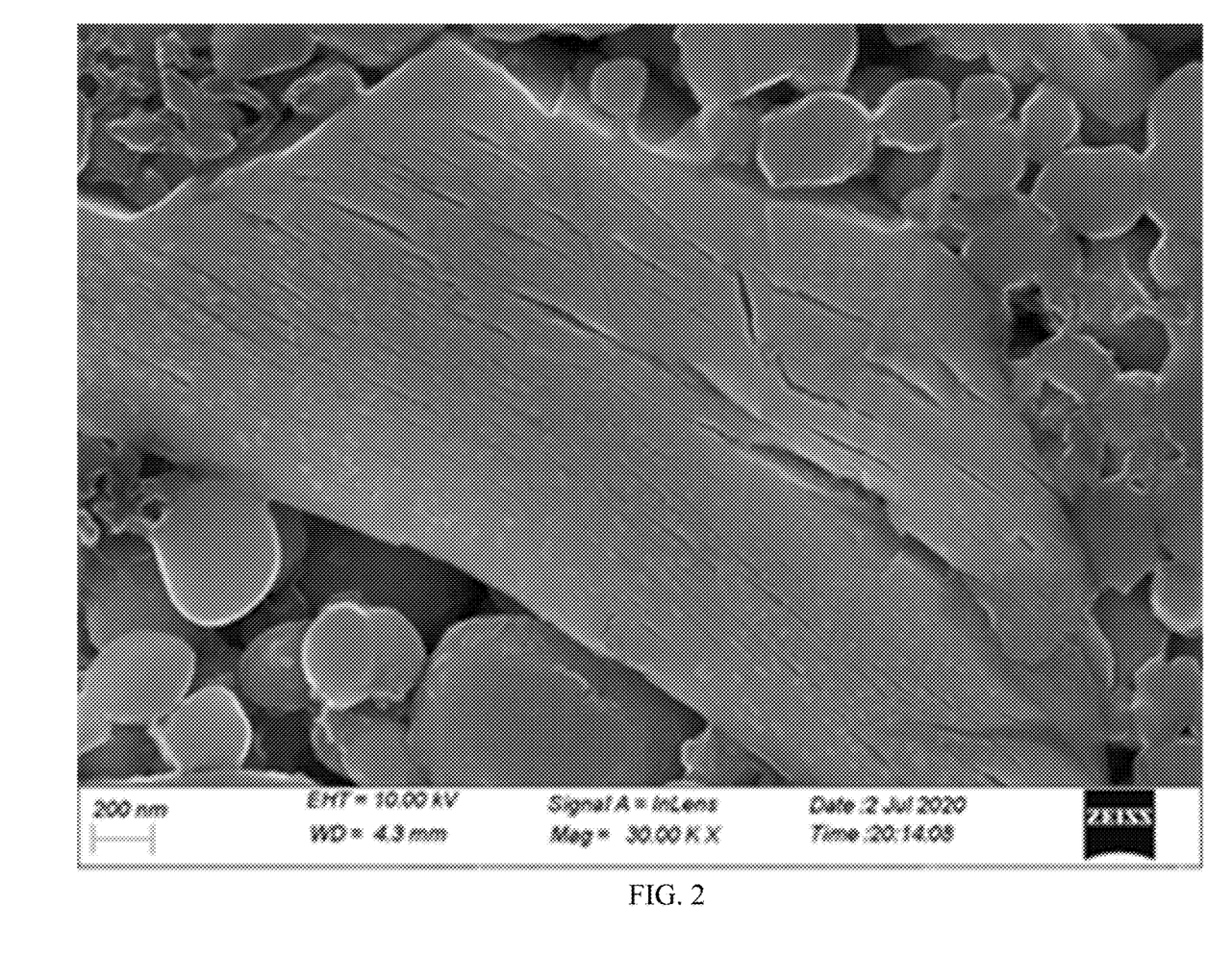
FIG. 2 is a SEM image of a composite positive-electrode material according to an embodiment of this application.

In some implementations, in the composite positive-electrode material, the positive-electrode active material is distributed on the surface of the core in a form of independent particles. A profile of the composite positive-electrode material can be observed by using a scanning electron microscope (for example, SIGMA300). FIG. 1 is a SEM image of the composite positive-electrode material in an example. FIG. 2 is a SEM image of a cross-section of the composite positive-electrode material in an example. The cross-section of the composite positive-electrode material can be obtained by using an ion polisher (for example, an argon ion cross-section polisher, such as IB-19500CP). It can be seen from the image that in the composite positive-electrode material, the surface of core particles is coated with a large number of particles of the positive-electrode active material.

In this application, when the positive-electrode pre-lithiation material is distributed on the surface of the positive-electrode active material in a form of independent particles, the positive-electrode active material on the surface of the composite positive-electrode material can form an effective physical barrier, to avoid direct contact between the positive-electrode pre-lithiation material and the electrolyte, and reduce side reaction, thereby further improving electrochemical stability of the positive-electrode pre-lithiation material. In addition, the positive-electrode active material in particle form can also better exert its high capacity characteristics. Therefore, the battery using the composite positive-electrode material can implement a higher energy density and better cycling performance.

In some embodiments, the core and the coating layer may be bonded through physical bonding (for example, intermolecular force) or chemical bonding. In some embodiments, in the composite positive-electrode material, bonding between the core and the coating layer is implemented through intermolecular force between the particles of the positive-electrode pre-lithiation material and the positive-electrode active material. In this application, the positive-electrode pre-lithiation material and the positive-electrode active material are bonded by intermolecular force, so that the particles of the positive-electrode active material are closely attached to the surface of the positive-electrode pre-lithiation material, to implement microstructure stability and electrochemical stability of the composite positive-electrode material. Therefore, the battery using the composite positive-electrode material can obtain good long-term cycling performance.

In some embodiments, a coverage rate of the particles of the positive-electrode active material on the surface of the positive-electrode pre-lithiation material is ≥60%, in some other embodiments, being ≥70%, ≥80%, ≥90%, ≥95%, or 100%. In this application, the coverage ratio of the particles of the positive-electrode active material on the surface of the positive-electrode pre-lithiation material being within the foregoing range can further reduce sensitivity of the composite positive-electrode material to the external environment (especially humidity), effectively improve a gel problem of the composite positive-electrode material in the preparation process of the positive-electrode slurry, and improve processability of the composite positive-electrode material in the battery application process.

In some implementations, the median particle size $D_v50$ of the positive-electrode pre-lithiation material may be 2 μm-35 μm. In some embodiments, $D_v50$ of the positive-electrode pre-lithiation material is 4 μm-30 μm, and in some other embodiments 5 μm-30 μm, 5 μm-25 μm, 5 μm-20 μm, 10 μm-25 μm, 10 μm-20 μm, 12 μm-20 μm, 15 μm-25 μm, or 15 μm-20 μm. The positive-electrode pre-lithiation material with $D_v50$ being in an appropriate range can improve the transmission process of lithium ions inside the particles, reduce ion migration resistance, reduce a contact area between the material and the electrolyte, and reduce side reaction between the electrolyte and the material. This can improve a utilization rate of the positive-electrode pre-lithiation material, and further improve an energy density and cycling performance of the battery.

In some implementations, the median particle size $D_v50$ of the positive-electrode active material is 0.1 μm-15 μm. In some embodiments, $D_v50$ of the positive-electrode active material is 0.2 μm-10 μm, and in some other embodiments, 0.2 μm-2 μm, 0.2 μm-5 μm, 0.5 μm-1.5 μm, 0.8 μm-1.2 μm, 0.5 μm-6 μm, 1 μm-15 μm, 2 μm-10 μm, 3 μm-8 μm, 1 μm-5 μm, or 1 μm-1.5 μm. The positive-electrode active material with $D_v50$ being in an appropriate range can improve dispersion uniformity of the positive-electrode active material on the surface of the positive-electrode pre-lithiation material, to reduce agglomeration phenomenon. The coating layer formed on the surface of the positive-electrode pre-lithiation material has a better insulating and protective effect, and further improves stability of the material, thereby further improving the energy density of the battery. With the positive-electrode active material being attached to the surface of the positive-electrode pre-lithiation material, the positive-electrode pre-lithiation material can also play a role of stabilizing the positive-electrode active material, and a problem that the positive-electrode active material with smaller particle size is prone to agglomeration during cycling of the battery, thereby further improving the cycling performance of the battery. The positive-electrode active material is attached to the surface of the positive-electrode pre-lithiation material to form larger particles, which can also improve processing performance of the positive-electrode slurry and reduce a physical gel phenomenon, so that the positive-electrode plate with good overall consistency can be obtained through preparation, thereby improving overall performance of the battery. In addition, the positive-electrode active material with appropriate particle size can also improve the transmission performance of active ions in the particles of the active material, thereby helping further improve the cycling performance of the battery.

In some embodiments, the median particle size $D_v50$ of the composite positive-electrode material is 2 μm-40 μm, or 3 μm-38 μm, 3 μm-30 μm, 5 μm-25 μm, 8 μm-40 μm, 10 μm-35 μm, 10 μm-25 μm, 15 μm-30 μm, or 10 μm-20 μm. In this application, the composite positive-electrode material with the median particle size $D_v50$ being within the above range helps improve the compacted density of the positive-electrode plate, thereby helping increase the energy density of the battery. In addition, when the particles in the positive-electrode plate are in close contact with each other, and a pore structure that facilitates infiltration of the electrolyte is also formed, so that the battery can also obtain higher cycling performance.

In this application, the median particle size (also known as volume-average particle diameter) $D_v50$ of the positive-electrode active material, positive-electrode pre-lithiation material, and composite positive-electrode material has a meaning known in the art, and can be tested by using a method known in the art. For example, referring to GB/T 19077-2016 particle size distribution laser diffraction method, a laser particle size analyzer (for example, Malvern Mastersizer 2000E, UK) is used for testing. $D_v50$ is a particle size corresponding to a cumulative volume distribution percentage of the material reaching 50%.

In some implementations, in the composite positive-electrode material, the mass ratio of the positive-electrode pre-lithiation material to the positive-electrode active material may be 1:2-1:35. When the mass ratio of the positive-electrode pre-lithiation material to the positive-electrode active material falls within an appropriate range, a coating layer with the positive-electrode active material with an appropriate thickness can be formed on the surface of the positive-electrode pre-lithiation material. This effectively improves stability of the material and also ensures that lithium can be fully deintercalated from the positive-electrode pre-lithiation material under the coating layer, thereby ensuring efficient use of pre-lithiation performance. In addition, the composite positive-electrode material includes sufficient positive-electrode active material, so that the positive electrode has a large number of lithium sites for repeated deintercalation of lithium ions, improving reversible capacity of the battery. Therefore, the battery using the composite positive-electrode material can implement a higher energy density and better cycling performance.

In some embodiments, in the composite positive-electrode material, the mass ratio of positive-electrode pre-lithiation material to the positive-electrode active material is 1:5-1:30, and in some other embodiments 1:5-1:25, 1:10-1:20, 1:12-1:18, or 1:15-1:20. When the mass ratio of the positive-electrode pre-lithiation material to the positive-electrode active material falls within the foregoing range, the battery can implement a relatively high energy density and a longer cycle life.

In this application, the mass ratio of the positive-electrode pre-lithiation material to the positive-electrode active material in the composite positive-electrode material can be tested by using a testing method known in the art, for example, an ICP (Inductively Coupled Plasma) atomic emission spectroscopy. The test can be conducted by using an inductively coupled plasma atomic emission spectrometer (for example, ICAP7400 manufactured by Thermo Fisher Scientific, USA). An example testing method is as follows: adding 2 g of the composite positive-electrode material to an acid solution (such as aqua regia) for digestion, where digestion may be performed during stirring (for example, mechanical stirring or microwave stirring), and a digestion time may be 30 min; and adding the digested solution to the ICAP7400 spectrometer to quantitatively analyze chemical constituent elements in the composite positive-electrode material. Through quantification of the elements, a mass of the compound containing the elements is determined, so as to calculate the final mass ratio of the positive-electrode active material to the positive-electrode pre-lithiation material.

It should be noted that the test sample can be directly obtained from the composite positive-electrode material, or from the positive-electrode plate of the secondary battery. An example method of obtaining the composite positive-electrode material from the secondary battery is as follows:

(1) Discharging the secondary battery (for sake of safety, the battery is generally in a fully discharged state), disassembling the battery, and taking out the positive-electrode plate, using dimethyl carbonate (DMC) to soak the positive-electrode plate for a specific time (for example, 2 hours), taking out the positive-electrode plate and drying it at a given temperature for a specific time (for example, 80° C., 6 h), and then taking out the positive-electrode plate obtained after drying.

(2) Baking, at a given temperature for a specific time (for example, 120° C., 6 h), the positive-electrode plate obtained after drying in step (1), randomly selecting a region from the positive-electrode plate obtained after baking, and obtaining a composite positive-electrode material sample. For example, the sample may be obtained by scraping powder using a blade.

(3) Sieving the composite positive-electrode material collected in step (2) (for example, sieving with a 200-mesh screen), to finally obtain composite positive-electrode material samples that can be used for testing the foregoing material parameters of this application.

In some implementations, the lithium-rich metal oxide is selected from one or more of $Li_2M^1O_2$, $Li_2M^2O_3$, $Li_3M^3O_4$, $Li_5M^4O_4$, and $Li_6M^5O_4$. A valence state of each metal element other than Li in the lithium-rich metal oxide is lower than its own highest oxidation valence state. In $Li_2M^1O_2$, $M^1$ may include one or more of Ni, Co, Fe, Mn, Zn, Mg, Ca, and Cu. In some embodiments, $M^1$ includes one or more of Ni, Co, Mn, and Cu. In some embodiments, $M^1$ includes one or more of Ni, Cu, and Mn. As an example, $Li_2M^1O_2$ may include one or more of $Li_2NiO_2$, $Li_2MnO_2$, $Li_2CuO_2$, $Li_2Cu_{x1}Ni_{1-x1-y1}M_{y1}O_2$, and $Li_2Co_{x2}Mn_{1-x2}O_2$. In some embodiments, $Li_2M^1O_2$ includes one or more of $Li_2NiO_2$, $Li_2CuO_2$, and $Li_2Cu_{x1}Ni_{1-x1-y1}M_{y1}O_2$. In some embodiments, $Li_2M^1O_2$ includes $Li_2Cu_{x1}Ni_{1-x1-y1}M_{y1}O_2$, where $0<x1<1$, $0≤y1<0.1$, and M is selected from one or more of Zn, Sn, Mg, Fe, and Mn; $0<x2<1$; in some embodiments, $0.1≤x1≤0.9$, $0.2≤x1≤0.8$, $0.4≤x1≤0.6$, or $0.5≤x1≤0.7$. In some embodiments, $0.5≤x2≤0.8$.

In $Li_2M^2O_3$, $M^2$ may include one or more of Mn, Sn, Mo, Ru, and Ir. In some embodiments, $M^2$ includes one or more of Mn, Mo, and Sn. As an example, $Li_2M^2O_3$ may include one or more of $Li_2MnO_3$ and $Li_2MoO_3$.

In $Li_3M^3O_4$, $M^3$ may include one or more of V, Nb, Cr, and Mo. In some embodiments, $M^3$ includes one or more of V, Nb, and Mo. As an example, $Li_3M^3O_4$ may include one or more of $Li_3VO_4$, $Li_3NbO_4$, and $Li_3MoO_4$. In some embodiments, $Li_3M^3O_4$ includes one or more of $Li_3VO_4$ and $Li_3NbO_4$.

In $Li_5M^4O_4$, $M^4$ may include one or more of Fe, Cr, V, and Mo. In some embodiments, $M^4$ includes one or more of Fe, Cr, and V. As an example, $Li_5M^4O_4$ may include one or more of $Li_5FeO_4$, $Li_5CrO_4$, and $Li_5VO_4$. In some embodiments, $Li_5M^4O_4$ includes $Li_5FeO_4$.

In $Li_6M^5O_4$, $M^5$ may include one or more of Co, V, Cr, and Mo. In some embodiments, $M^5$ includes one or more of Co, V, and Cr. As an example, $Li_6M^5O_4$ may include one or more of $Li_6CoO_4$, $Li_6VO_4$, and $Li_6CrO_4$. In some embodiments, $Li_6M^5O_4$ includes $Li_6CoO_4$.

In some implementations, the lithium-rich metal oxide may include one or more of $Li_2M^1O_2$, $Li_2M^2O_3$, $Li_5M^4O_4$, and $Li_6M^5O_4$. In some embodiments, the lithium-rich metal oxide may include one or more of $Li_2M^1O_2$, $Li_5M^4O_4$, and $Li_6M^5O_4$. $M^1$, $M^2$, $M^4$, and $M^5$ are as defined in this specification.

In some implementations, the lithium-rich metal oxide may include one or more of $Li_3VO_4$, $Li_2MnO_2$, $Li_3NbO_4$, $Li_5FeO_4$, $Li_6CoO_4$, $Li_2NiO_2$, $Li_2CuO_2$, and $Li_2Cu_{x1}Ni_{1-x1-y1}M_{y1}O_2$. In some embodiments, the lithium-rich metal oxide includes one or more of $Li_5FeO_4$, $Li_6CoO_4$, $Li_2NiO_2$, $Li_2CuO_2$, and $Li_2Cu_{x1}Ni_{1-x1-y1}M_{y1}O_2$. In some other embodiments, the lithium-rich metal oxide includes one or more of $Li_5FeO_4$, $Li_6CoO_4$, $Li_2CuO_2$, and $Li_2Cu_{x1}Ni_{1-x1-y1}M_{y1}O_2$; where $0<x1<1$, $0\leq y1<0.1$, and M is selected from one or more of Zn, Sn, Mg, Fe, and Mn. In some embodiments, $0.1\leq x1\leq 0.9$. In some other embodiments, $0.2\leq x1\leq 0.8$, $0.4\leq x1\leq 0.6$, or $0.5\leq x1\leq 0.7$.

In some implementations, the positive-electrode active material may be selected from one or more of layered lithium transition metal oxide, spinel-structured lithium metal oxide, and poly anionic positive-electrode material.

In some embodiments, the positive-electrode active material may include a layered lithium transition metal oxide. In some embodiments, the layered lithium transition metal oxide is selected from one or more of $LiCoO_2$, $LiNiO_2$, $LiMnO_2$, $LiNi_aCo_bMn_cO_2$, $LiNi_\alpha Co_\beta Al_\gamma O_2$, and modified materials thereof. In some embodiments, the layered lithium transition metal oxide includes one or more of $LiNi_aCo_bMn_cO_2$, $LiNi_\alpha Co_\beta Al_\gamma O_2$, and modified materials thereof; where $0<a<1$, $0<b<1$, $0<c<1$, and $a+b+c=1$. In some embodiments, $0.5\leq a\leq 0.9$ or $0.6\leq a\leq 0.85$. $0<\alpha<1$, $0<\beta<1$, $0<\gamma<1$, and $\alpha+\beta+\gamma=1$. In some embodiments, $0.5\leq\alpha\leq 0.9$ or $0.6\leq\alpha\leq 0.85$.

As an example, the layered lithium transition metal oxide may include one or more of $LiNi_{1/3}Co_{1/3}Mn_{1/3}O_2$ (NCM333), $LiNi_{0.5}Co_{0.2}Mn_{0.3}O_2$(NCM523), $LiNi_{0.6}Co_{0.2}Mn_{0.2}O_2$(NCM622), $LiNi_{0.8}Co_{0.1}Mn_{0.1}O_2$ (NCM811), and $LiNi_{0.85}Co_{0.15}Al_{0.05}O_2$.

In this application, modification in the modified material may be doping modification or coating modification.

In some embodiments, the positive-electrode active material may include a spinel-structured lithium metal oxide, such as lithium manganese oxide or lithium nickel manganese oxide. Specific examples are one or more of $LiMn_2O_4$, $LiNi_{0.5}Mn_{1.5}O_4$, and modified materials thereof. Modification in the modified material may be doping modification or coating modification.

In some embodiments, the positive-electrode active material includes a polyanionic positive-electrode material. The polyanionic positive-electrode material is a compound containing lithium, transition metal, and tetrahedral or octahedral anion structural units $(XO_z)^{t-}$, where X can be selected from P, S, As, Mo, and W. For example, X is P. $(XO_z)^{t-}$ may be $(PO_4)^-$. A crystal structure of the polyanionic positive-electrode material may be olivine type or NASICON type. In some embodiments, the polyanionic positive-electrode material may include one or more of $LiFePO_4$(LFP), $LiMnPO_4$, $LiCoPO_4$, $LiNiPO_4$, $Li_3V_2(PO_4)_3$, $LiFe_yMn_{1-y}PO_4$, and modified materials thereof, where $0<y<1$; in some embodiments, $0.2\leq y\leq 0.8$. In some other embodiments, the positive-electrode active material may include one or more of $LiFePO_4$, $LiMnPO_4$, $Li_3V_2(PO_4)_3$, and modified materials thereof. As an example, the positive-electrode active material includes $LiFePO_4$.

The inventor has found through further research that when the positive-electrode active material and the positive-electrode pre-lithiation material properly match, a capacity of the pre-lithiation material can be used to a greater extent, so that the battery can obtain a higher energy density. Further, the battery can also have better cycling performance.

In some embodiments, a charging cut-off voltage of the positive-electrode active material is 4.2V-5.2V (vs. $Li/Li^+$), and the lithium-rich metal oxide can be selected from one or more of $Li_6CoO_4$, $Li_5FeO_4$, $Li_2NiO_2$, $Li_2CuO_2$, $Li_2Cu_{x1}Ni_{1-x1-y1}M_{y1}O_2$, $Li_3VO_4$, and $Li_3NbO_4$.

In some embodiments, the lithium-rich metal oxide may be selected from one or more of $Li_5FeO_4$, $Li_6CoO_4$, $Li_2NiO_2$, $Li_2CuO_2$, and $Li_2Cu_{x1}Ni_{1-x1-y1}M_{y1}O_2$. In some other embodiments, the lithium-rich metal oxide includes one or more of $Li_6CoO_4$, $Li_5FeO_4$, $Li_2NiO_2$, and $Li_2Cu_{x1}Ni_{1-x1-y1}M_{y1}O_2$. Still in some other embodiments, the lithium-rich metal oxide may be selected from one or more of $Li_6CoO_4$, $Li_2NiO_2$, and $Li_2Cu_{x1}Ni_{1-x1-y1}M_{y1}O_2$. In some embodiments, the lithium-rich metal oxide includes or is $Li_2Cu_{x1}Ni_{1-x1-y1}M_{y1}O_2$. In the formula, $0<x1<1$, $0\leq y1<0.1$, and M is selected from one or more of Zn, Sn, Mg, Fe, and Mn. In some embodiments, $0.1<x1\leq 0.9$. In some other embodiments, $0.2\leq x1\leq 0.8$, $0.4\leq x1\leq 0.6$, or $0.5\leq x1\leq 0.7$.

In some embodiments, the positive-electrode active material may be selected from one or more of $LiCoO_2$, $LiNiO_2$, $LiMnO_2$, $LiNi_aCo_bMn_cO_2$, $LiNi_\alpha Co_\beta Al_\gamma O_2$, $LiMn_2O_4$, $LiNi_{0.5}Mn_{1.5}O_4$, $LiMnPO_4$, $LiCoPO_4$, $LiNiPO_4$, and modified materials thereof, where a, b, c, $\alpha$, $\beta$, and $\gamma$ are as defined in this specification. In some embodiments, the positive-electrode active material may include one or more of $LiNi_aCo_bMn_cO_2$, $LiNi_\alpha Co_\beta Al_\gamma O_2$, and modified materials thereof. In some embodiments, the positive-electrode active material may include one or more of $LiNi_aCo_bMn_cO_2$ and modified material thereof.

In some embodiments, the median particle size $D_v50$ of the positive-electrode active material is 1 μm-15 μm. In some other embodiments, $D_v50$ of the positive-electrode active material is 2 μm-10 μm, 2 μm-8 μm, 3 μm-7 μm, 4 μm-6 μm, 3 μm-5 μm, or 4 μm-7 μm. The positive-electrode active material with $D_v50$ being in an appropriate range can protect the positive-electrode pre-lithiation material and improve transmission performance of active ions in the particles, and can also reduce side reaction of the electrolyte on the surface of the particles, thereby further improving the capacity usage and cycling performance of the battery.

In some implementations, the charging cut-off voltage of the positive-electrode active material is 3.5V-4.2V (vs. $Li/Li^+$), and the lithium-rich metal oxide is selected from one or more of $Li_6CoO_4$, $Li_5FeO_4$, $Li_2NiO_2$, $Li_2CuO_2$, $Li_2Cu_{x1}Ni_{1-x1-y1}M_{y1}O_2$, and $Li_2MnO_2$, where $0<x1<1$, $0\leq y1<0.1$, M is selected from one or more of Zn, Sn, Mg, Fe, and Mn. In some embodiments, $0.2\leq x1\leq 0.8$, in some other embodiments, $0.5\leq x1\leq 0.8$, $0.4\leq x1\leq 0.6$, or $0.5\leq x1\leq 0.7$. In some embodiments, the lithium-rich metal oxide is selected from one or more of $Li_5FeO_4$, $Li_2CuO_2$, $Li_2Cu_{x1}Ni_{1-x1-y1}M_{y1}O_2$, and $Li_2MnO_2$. In some other embodiments, the lithium-rich metal oxide may be selected from one or more of $Li_5FeO_4$, $Li_2CuO_2$, and $Li_2Cu_{x1}Ni_{1-x1-y1}M_{y1}O_2$.

In some embodiments, the positive-electrode active material may be selected from one or more of $LiFePO_4$, $Li_3V_2(PO_4)_3$, and $LiFe_yMn_{1-y}PO_4$, where $0<y<1$. In some embodiments, $0.2 \leq y \leq 0.8$. In some embodiments, the positive-electrode active material may be selected from one or more of $LiFePO_4$ and $LiFe_yMn_{1-y}PO_4$.

In some embodiments, the median particle size $D_v50$ of the positive-electrode active material is 0.1 μm-3.5 μm. In some other embodiments, $D_v50$ of the positive-electrode active material is 0.2 μm-3 μm, 0.2 μm-2 μm, 0.5 μm-1.5 μm, 0.8 μm-1.2 μm, or 1 μm-1.5 μm. The positive-electrode active material with $D_v50$ being in an appropriate range can protect the positive-electrode pre-lithiation material, and improve dispersion performance of the positive-electrode active material and processing performance of the positive-electrode slurry, so that the composite active material has good active ion transmission performance, thereby further improving the capacity usage and cycling performance of the battery.

In this application, a charging-discharging voltage interval of the lithium-rich metal oxide of the inner core is close to that of the positive-electrode active material of the outer layer, thereby ensuring that both the capacity of the positive-electrode active material and that of the lithium-rich metal oxide of the pre-lithiation agent can be used to the greatest extent.

This application further provides a preparation method of composite positive-electrode material, and any one type of the foregoing composite positive-electrode materials can be obtained by using this preparation method.

The preparation method of composite positive-electrode material provided by this application may further include the steps: providing a core, where the core includes a positive-electrode pre-lithiation material, and the positive-electrode pre-lithiation material includes a lithium-rich metal oxide; providing a coating material, where the coating material includes a positive-electrode active material; and coating at least part of a surface of the core by using the coating material to obtain a composite positive-electrode material.

In the preparation method, the core may be selected from the lithium-rich metal oxides described herein, and the coating material may be selected from the positive-electrode active materials described herein.

In the preparation method, any means capable of stably coating the surface of the core by using the coating material can be used. As an example, mechanofusion coating may be performed by using a mechanical fusion machine, so that the coating material can coat the surface of the core. For example, the core is the positive-electrode pre-lithiation material, and the coating material is the positive-electrode active material. Intermolecular force can be used between the positive-electrode active material and the positive-electrode pre-lithiation material to form a uniform and firm coating bond.

In some embodiments, in the mechanofusion coating process, high-speed fusion can be performed for 1 h-10 h at a rotating speed of 200 rpm (revolution per minute) to 1000 rpm, so that the positive-electrode active material coats the surface of the positive-electrode pre-lithiation material, to obtain the composite positive-electrode material. In some embodiments, the rotating speed is 300 rpm-800 rpm. In some embodiments, a fusion time is 2 h-6 h. Fusion can be performed at room temperature, for example, 25° C.

$D_v50$ of the positive-electrode pre-lithiation material or positive-electrode active material being as described herein can also improve the fusion coating process, reduce agglomeration phenomenon of the positive-electrode active material, and obtain uniform and firm coating effects.

The preparation method of this application also has advantages of simple process and easy operation.

It can be understood that preferred features and preferred solutions described for the composite positive-electrode material of this application are also applicable to the preparation method of composite positive-electrode material in this application, with corresponding beneficial effects achieved.

This application further provides a secondary battery, including a positive-electrode plate, where the positive-electrode plate includes any one or more of the composite positive-electrode materials of this application. The secondary battery of this application can have a higher initial charging-discharging capacity, a higher energy density, and a longer cycle life.

The secondary battery further includes a negative-electrode plate and an electrolyte. During charging and discharging of the secondary battery, active ions are intercalated and deintercalated back and forth between the positive-electrode plate and the negative-electrode plate. The electrolyte is between the positive-electrode plate and the negative-electrode plate, and plays a role of conducting ions.

[Positive-Electrode Plate]

This application provides a positive-electrode plate, which includes a positive-electrode current collector and a positive-electrode film layer that is provided on the positive-electrode current collector, the positive-electrode film layer includes an active material, and the active material includes any one or more of composite positive-electrode materials of this application.

For example, the positive-electrode current collector has two surfaces opposite in its thickness direction, and the positive-electrode film layer is provided on either or both of the two opposite surfaces of the positive-electrode current collector.

In the positive-electrode plate of this application, the positive-electrode current collector may use a material with good electrical conductivity and mechanical strength. As an example, the positive-electrode current collector may use an aluminum foil.

In the positive-electrode plate of this application, the positive-electrode film layer usually includes the active material and, in some embodiments, a binder, in some embodiments, a conductive agent, and is usually obtained through drying and cold pressing after a positive-electrode slurry is applied. The positive-electrode slurry is usually obtained by dispersing the active material and in some embodiments a conductive agent, a binder, or the like in a solvent and stirring uniformly. The solvent may be N-methylpyrrolidone (NMP).

In the positive-electrode plate of this application, in addition to the composite positive-electrode material of this application, the active material may further include other active materials that can be used for the positive electrode of the secondary battery. Other active materials may include one or more of layer lithium transition metal oxide, olivine-structured lithium-containing phosphate, and respective modified compounds thereof, for example, one or more of lithium nickel cobalt manganese oxide, lithium nickel cobalt aluminum oxide, lithium cobalt oxide, lithium nickel oxide, lithium manganese oxide, lithium iron phosphate, lithium manganese phosphate, lithium iron manganese phosphate, lithium iron vanadium phosphate, and modified compounds thereof.

In some embodiments, based on the total weight of the positive-electrode film layer, the positive-electrode film layer may contain 70 wt %-97 wt % of the active material. In some embodiments, the weight ratio of the active material to the positive-electrode film layer is 85%-97%, 90%-97%, or 95%-97%. The energy density and cycle life of the secondary battery can be further improved by adjusting a proportion of the active material in the positive-electrode film layer.

The binder can stably attach the positive-electrode active material and in some embodiments the conductive agent to the positive-electrode current collector. In some embodiments, based on the total weight of the positive-electrode film layer, the positive-electrode film layer may contain 1 wt %-25 wt % of the binder. In some embodiments, the weight ratio of the binder to the positive-electrode film layer is 1%-10%, 1%-5%, or 2%-5%.

In some implementations, the binder of the positive-electrode film layer may include one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethyl ene terpolymer, tetrafluoroethylene-hexafluoropropylene copolymer, and modified polymers thereof.

The conductive agent can improve electronic conductivity of the positive-electrode film layer. In some embodiments, based on the total weight of the positive-electrode film layer, the positive-electrode film layer may contain 2 wt %-20 wt % of the conductive agent. In some embodiments, the weight ratio of the conductive agent to the positive-electrode film layer is 2%-10% or 2%-5%.

In some implementations, the conductive agent of the positive-electrode film layer is one or more of superconducting carbon, carbon black (for example, Super P, acetylene black, or Ketjen black), carbon dots, carbon nanotube, graphene, and carbon nanofiber.

It should be noted that the composition or parameters of the positive-electrode film layer described in this application are all the composition or parameter ranges of a single-side film layer of the positive-electrode current collector. When the positive-electrode film layer is disposed on two opposite surfaces of the positive-electrode current collector, the composition or parameters of the positive-electrode film layer on any one of the surfaces satisfies this application, that is, being considered to fall within the protection scope of this application.

[Negative-Electrode Plate]

The negative-electrode plate of this application includes a negative-electrode current collector and a negative-electrode film layer provided on at least one surface of the negative-electrode current collector.

For example, the negative-electrode current collector has two surfaces opposite in its thickness direction, and the negative-electrode film layer is provided on either or both of the two opposite surfaces of the negative-electrode current collector.

The negative-electrode current collector can be made of a material with good electrical conductivity and mechanical strength to implement functions of conduction and current collection. In some embodiments, the negative-electrode current collector may use a copper foil.

In the negative-electrode plate of this application, the negative-electrode film layer usually includes a negative-electrode active material and in some embodiments a binder, in some embodiments a conductive agent, and other auxiliary agents. The negative-electrode plate is usually formed by coating a negative-electrode slurry on the negative-electrode current collector through drying and cold pressing. The negative-electrode slurry is usually obtained by dispersing the negative-electrode active material and in some embodiments a conductive agent, in some embodiments a binder, in some embodiments an auxiliary agent, or the like in a solvent and stirring uniformly. The solvent may be N-methylpyrrolidone (NMP) or deionized water.

In some implementations, the negative-electrode active material may include one or more of artificial graphite, natural graphite, silicon-based material, and tin-based material. In some embodiments, the negative-electrode active material includes one or more of artificial graphite and natural graphite. In some embodiments, the negative-electrode active material includes artificial graphite.

In some implementations, the conductive agent is one or more of superconducting carbon, carbon black (for example, Super P, acetylene black, or Ketjen black), carbon dots, carbon nanotube, graphene, and carbon nanofiber.

In some implementations, the binder may include one or more of styrene-butadiene rubber (SBR), water-based acrylic resin, polyvinyl alcohol (PVA), sodium alginate (SA), and carboxymethyl chitosan (CMCS).

In some implementations, other auxiliary agents are, for example, a thickener (for example, sodium carboxymethyl cellulose CMC-Na) or a PTC thermistor material.

[Electrolyte]

The electrolyte is between the positive-electrode plate and the negative-electrode plate, and plays a role of conducting ions. This application has no specific limitation on a type of the electrolyte, which can be selected as required. For example, the electrolyte may be selected to be liquid electrolyte. The electrolyte includes an electrolytic salt and a solvent.

In some embodiments, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bisfluorosulfonylimide), LiTFSI (lithium bistrifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the electrolyte includes an additive. For example, the additive may include a negative-electrode film forming additive, or may include a positive-electrode film forming additive, or may include an additive capable of improving some performance of a battery, for example, an additive for improving over-charge performance of the battery, an additive for improving high-temperature performance of the battery, and an additive for improving low-temperature performance of the battery.

[Separator]

The separator was sandwiched between the positive-electrode plate and the negative-electrode plate for isolation.

The secondary battery of this application imposes no special limitation on a type of the electrolyte in this application, and any known separator of a porous structure used for the secondary battery can be selected. For example, the separator may be selected from one or more of glass fiber separator, non-woven fabric separator, polyethylene separator, polypropylene separator, and polyvinylidene fluoride separator, and includes one or more of multi-layer composite films containing one or more of the foregoing separators.

The positive-electrode plate, the separator, and the negative-electrode plate may be made into an electrode assembly through a winding process or a lamination process, so that the separator is sandwiched between the positive-electrode plate and the negative-electrode plate for isolation. The electrode assembly is placed in an outer package, and the electrolyte is injected, to obtain a secondary battery.

The outer package of the secondary battery is used to encapsulate the electrode assembly and the electrolyte. In some implementations, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, may include one or more of polypropylene (PP), polybutylene terephthalate (PBT), polybutylene succinate (PBS), and the like.

Figure 3:
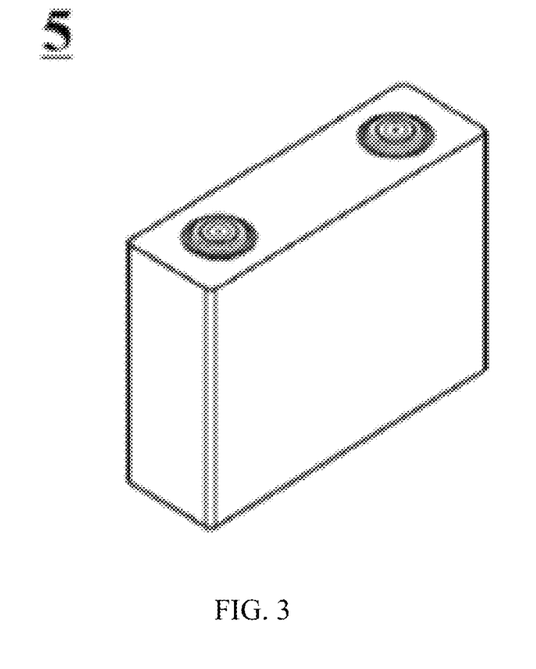
FIG. 3 is a schematic diagram of a secondary battery according to an embodiment.

This application does not impose any special limitations on a shape of the secondary battery, and the lithium-ion battery may be of a cylindrical shape, a rectangular shape, or any other shapes. FIG. 3 shows a secondary battery 5 with a rectangular structure in an example.

Figure 4:
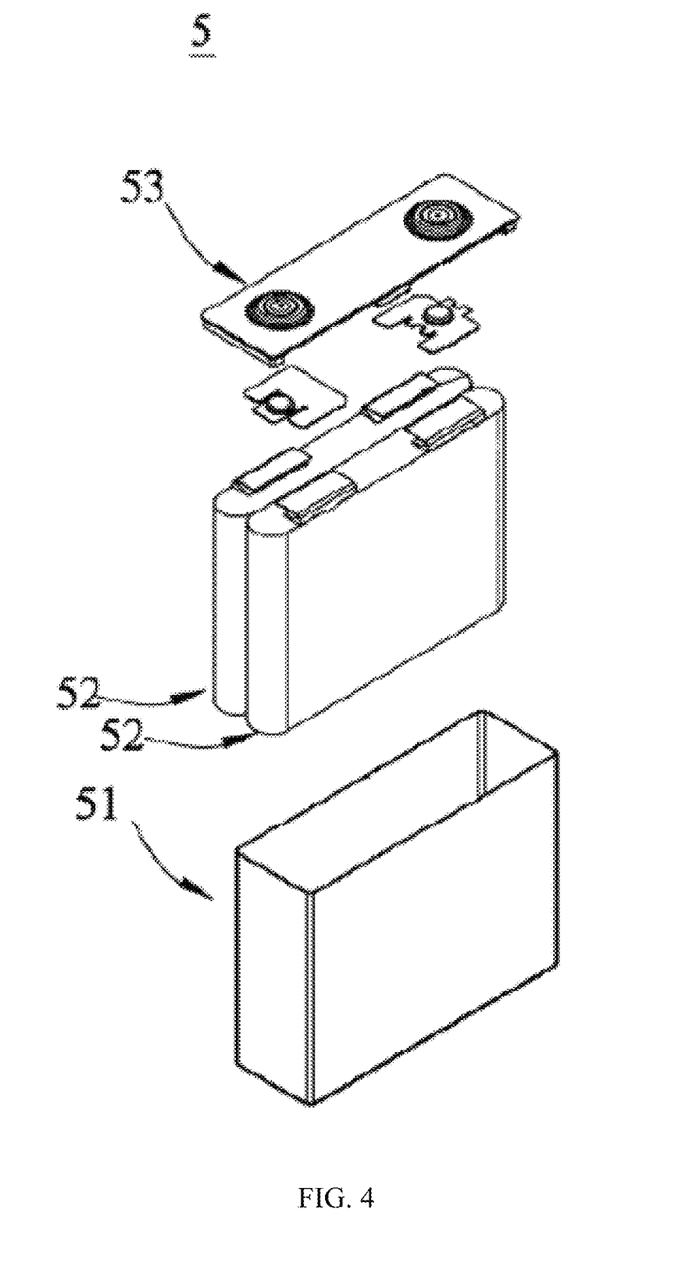
FIG. 4 is an exploded view of FIG. 3.

In some embodiments, referring to FIG. 4, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. The electrode assembly 52 is encapsulated into the accommodating cavity. The electrolyte is infiltrated into the electrode assembly 52. There may be one or more electrode assemblies 52 in the secondary battery 5, and the quantity may be adjusted as required.

In some embodiments, such secondary batteries may be combined to assemble a battery module. The battery module may include a plurality of secondary batteries whose quantity may be adjusted according to the use case and capacity of the battery module.

Figure 5:
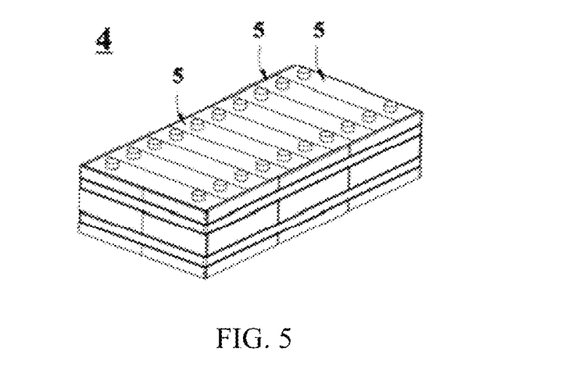
FIG. 5 is a schematic diagram of a battery module according to an embodiment.

FIG. 5 shows a battery module 4 in an example. Referring to FIG. 5, in the battery module 4, a plurality of secondary batteries 5 may be sequentially arranged in a length direction of the battery module 4; and certainly, may alternatively be arranged in any other manners. Further, the plurality of secondary batteries 5 may be fastened through fasteners.

In some embodiments, the battery module 4 may further include a housing with an accommodating space, and the plurality of secondary batteries 5 are accommodated in the accommodating space.

In some embodiments, battery modules may be further assembled into a battery pack, and a quantity of battery modules included in the battery pack may be adjusted based on application and capacity of the battery pack.

Figure 6:
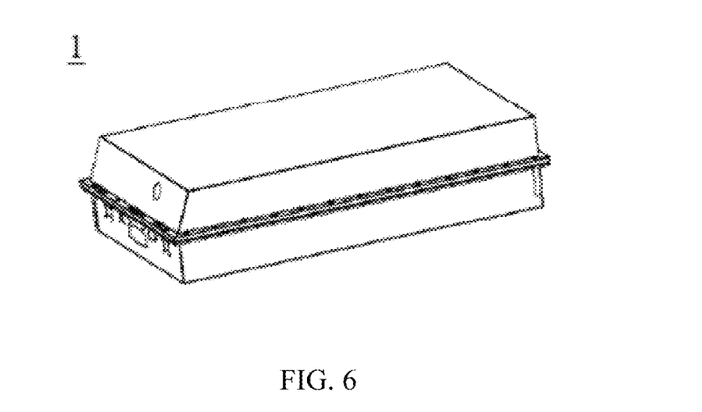
FIG. 6 is a schematic diagram of a battery pack according to an embodiment.
Figure 7:
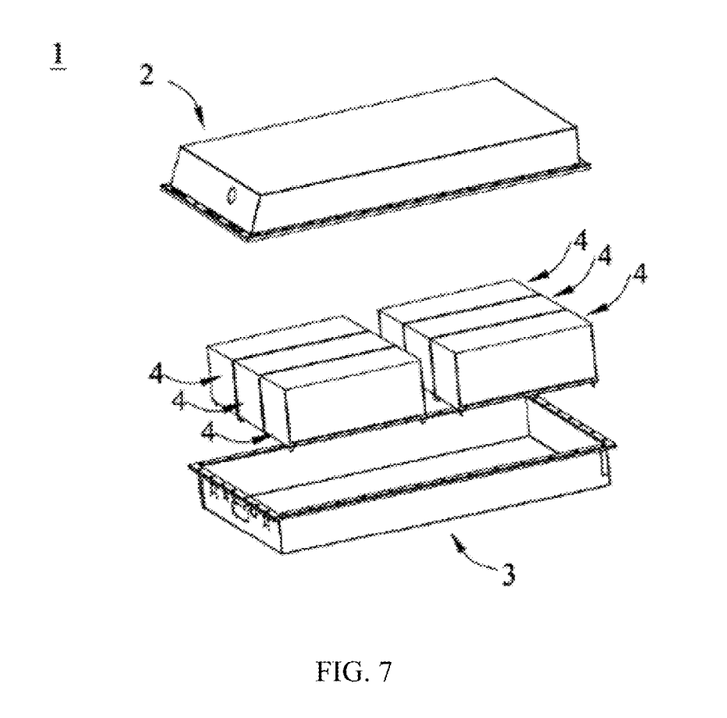
FIG. 7 is an exploded view of FIG. 6.

FIG. 6 and FIG. 7 show a battery pack 1 in an example. Referring to FIG. 6 and FIG. 7, the battery pack 1 may include a battery box and a plurality of battery modules 4 arranged in the battery box. The battery box includes an upper case 2 and a lower case 3. The upper case 2 may cover the lower case 3 to form a closed space for accommodating the battery modules 4. The plurality of battery modules 4 may be arranged in the battery box in any manner.

This application further provides an apparatus. The apparatus includes at least one of the secondary battery, the battery module, or the battery pack according to this application. The secondary battery, the battery module, or the battery pack may be used as a power source of the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 8:
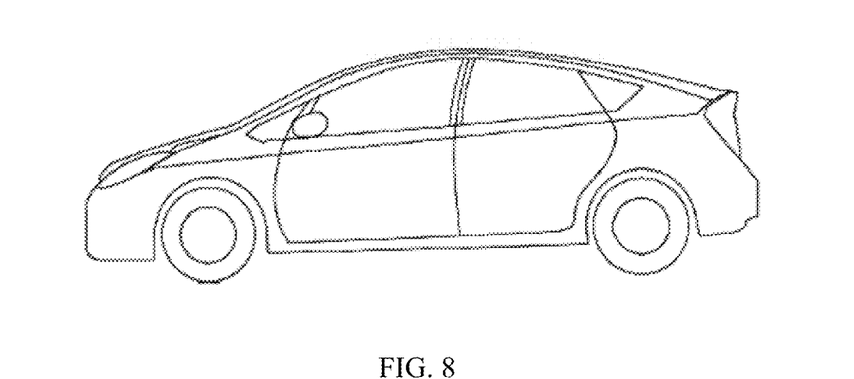
FIG. 8 is a schematic diagram of an apparatus using a secondary battery as a power source according to an embodiment.

FIG. 8 shows an apparatus used as an example. The apparatus is a battery electric vehicle, a hybrid electric vehicle, a plug-in hybrid electric vehicle, or the like. To meet a requirement of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power source.

EXAMPLES

The following examples describe in more detail content disclosed in this application. These examples are intended only for illustrative purposes because various modifications and changes made without departing from the scope of the content disclosed in this application are apparent to those skilled in the art. Unless otherwise stated, all parts, percentages, and ratios reported in the following examples are based on weights, all reagents used in the examples are commercially available or synthesized in a conventional manner, and can be used directly without further processing, and all instruments used in the examples are commercially available.

Example 1

Preparation of the Lithium-Ion Secondary Battery:
Preparation of the Composite Positive-Electrode Material The positive-electrode pre-lithiation material was $Li_2Cu_{0.6}Ni_{0.4}O_2$, and the median particle size $D_v50$ was 15 μm. The positive-electrode active material was $LiFePO_4$ (lithium iron phosphate, LFP), and the median particle size $D_v50$ was 1 μm. A mechanical fusion machine was used for high-speed mechanofusion coating: the positive-electrode pre-lithiation material $Li_2Cu_{0.6}Ni_{0.4}O_2$ and the positive-electrode active material LFP were mixed in a mass ratio of 1:35, and high-speed fusion was performed for 4 h at 400 rpm, so that LFP coats an outer surface of $Li_2Cu_{0.6}Ni_{0.4}O_2$ to obtain a composite positive-electrode material.

Preparation of the Positive-Electrode Plate

The composite positive-electrode material prepared above, a conductive agent carbon black (Super P), a binder PVDF were dispersed in a solvent NMP in a mass ratio of 97:2:1, and were fully stirred and mixed to obtain a positive-electrode slurry. The positive-electrode slurry was applied on an aluminum foil of the positive-electrode current collector, followed by drying and cold pressing, to obtain a positive-electrode plate. An areal density of the positive-electrode film layer was 17.5 mg/cm$^2$, and a compacted density was 2.35 g/cm$^3$.

Preparation of the Negative-Electrode Plate

A negative-electrode active material artificial graphite, a conductive agent carbon black (Super P), a binder styrene-butadiene rubber (SBR), and a thickener sodium carboxymethyl cellulose (CMC-Na) were fully stirred and mixed in a solvent deionized water in a mass ratio of 96:1.5:1.5:1.0, to form a uniform negative-electrode slurry. The negative-electrode slurry was applied on a copper coil of the negative electrode current collector, followed by drying and cold pressing, to obtain a negative-electrode plate. An areal density of the negative-electrode film layer was 8.0 mg/cm$^2$, and a compacted density was 1.65 g/cm$^3$.

Preparation of the Electrolyte

Ethylene carbonate (EC) and ethyl methyl carbonate (EMC) were uniformly mixed in a mass ratio of 30:70, to obtain an organic solvent. Then, lithium salt $LiPF_6$ was uniformly dissolved in the organic solvent to obtain the electrolyte, where concentration of $LiPF_6$ was 1 mol/L.

Preparation of the Secondary Battery

A positive-electrode plate, a porous separator polyethylene (PE), and a negative-electrode plate were stacked in order and wound to obtain an electrode assembly, the electrode assembly was placed in an outer package, and the electrolyte was injected, to obtain a secondary battery.

Examples 2 to 30 and Comparative Examples 1 to 6

Preparation of the secondary battery is similar to that in Example 1, with the only difference in related preparation parameters of the composite positive-electrode material. For details, refer to Table 1.

In Examples 26 to 30 and Comparative Example 4 to 6, the positive-electrode active material used $LiNi_{0.8}Co_{0.1}Mn_{0.1}O_2$ (NCM811); for the positive-electrode film layer, an areal density was 19.5 mg/cm$^2$ and a compacted density was 3.4 mg/cm$^2$; and for the negative-electrode film layer, an areal density was 10.8 mg/cm$^2$ and a compacted density was 1.65 g/cm$^3$.

In Comparative Examples 1 and 4, there is no positive-electrode pre-lithiation.

In Comparative Example 2, the positive-electrode pre-lithiation material $Li_2Cu_{0.6}Ni_{0.4}O_2$ was mixed with the positive-electrode active material LFP in a mass ratio of 1:15, and the resulting mixed material, the conductive agent Super P, and the binder PVDF were dispersed in the NMP in a mass ratio of 97:2:1, so as to prepare the positive-electrode slurry.

In Comparative Example 3, the positive-electrode pre-lithiation material $Li_2Cu_{0.6}Ni_{0.4}O_2$ used $Li_2Cu_{0.6}Ni_{0.4}O_2/Al_2O_3$ (with 2 wt % of $Al_2O_3$) that was obtained through coating of aluminum oxide particles, the positive-electrode pre-lithiation material $Li_2Cu_{0.6}Ni_{0.4}O_2/Al_2O_3$ and the positive-electrode active material LFP were mixed in a mass ratio of 1:15, and the resulting mixed material, the conductive agent Super P, and the binder PVDF were dispersed in the NMP in a mass ratio of 97:2:1, so as to prepare the positive-electrode slurry.

In Comparative Example 5, the positive-electrode pre-lithiation material $Li_2Cu_{0.6}Ni_{0.4}O_2$ was mixed with the positive-electrode active material NCM811 in a mass ratio of 1:20, and the resulting mixed material, the conductive agent Super P, and the binder PVDF were dispersed in the NMP in a mass ratio of 97:2:1, so as to prepare the positive-electrode slurry.

In Comparative Example 6, the positive-electrode pre-lithiation material used $Li_2Cu_{0.6}Ni_{0.4}O_2/Al_2O_3$ (with 2 wt % of $Al_2O_3$), the positive-electrode pre-lithiation material $Li_2Cu_{0.6}Ni_{0.4}O_2/Al_2O_3$ and the positive-electrode active material NCM811 were mixed in a mass ratio of 1:20, and the resulting mixed material, the conductive agent Super P, and the binder PVDF were dispersed in the NMP in a mass ratio of 97:2:1, so as to prepare the positive-electrode slurry.

Secondary-Battery Performance Testing:

At 25° C., the secondary battery was charged to an upper limit cut-off voltage at a constant current rate of 1 C and charged to a current of 0.05 C at a constant voltage, and then a charging capacity at that time was recorded, which was a first-cycle charging capacity; and discharged to a lower limit cut-off voltage at a constant current rate of 1 C and left standing for 5 min, which was one cyclic charging and discharging process, and then a discharge capacity at that time was recorded, which was a first-cycle discharging capacity. The battery was charged and discharged by using the foregoing method and the discharging capacity of each cycle was recorded, until a capacity retention rate of the battery decays to 80%. The number of cycles at that time was the cycle life.

First-time charging gram capacity (mAh/g)=$1^{st}$-cycle charging capacity/Mass of the composite positive-electrode material contained in the battery First-time discharging gram capacity (mAh/g)=$1^{st}$-cycle discharging capacity/Mass of the composite positive-electrode material contained in the battery $N$th-cycle capacity retention rate(%) of the secondary battery=$N$th-cycle discharging capacity/$1^{st}$-cycle discharging capacity×100%

In the test, when the positive-electrode active material was LFP, the charging-discharging voltage range of the secondary battery was 2.5V-3.65V; and when the positive-electrode active material was NCM811, the charging-discharging voltage range of the secondary battery was 2.8V-4.25V.

TABLE 1

| Sequence number | Positive-electrode pre-lithiation material | Positive-electrode active material | Mass ratio | $D_v50$ of positive-electrode active material (μm) | $D_v50$ of positive-electrode pre-lithiation material (μm) | First-time charging gram capacity (mAh/g) | First-time discharging gram capacity (mAh/g) | Cycle life (cycles) |
|---|---|---|---|---|---|---|---|---|
| Example 1 | $Li_2Cu_{0.6}Ni_{0.4}O_2$ | LFP | 1:35 | 1 | 15 | 213.2 | 145.5 | 5595 |
| Example 2 | $Li_2Cu_{0.6}Ni_{0.4}O_2$ | LFP | 1:30 | 1 | 15 | 216.4 | 148.5 | 5710 |

TABLE 1-continued

| Sequence number | Positive-electrode pre-lithiation material | Positive-electrode active material | Mass ratio | $D_v50$ of positive-electrode active material (μm) | $D_v50$ of positive-electrode pre-lithiation material (μm) | First-time charging gram capacity (mAh/g) | First-time discharging gram capacity (mAh/g) | Cycle life (cycles) |
|---|---|---|---|---|---|---|---|---|
| Example 3 | $Li_2Cu_{0.6}Ni_{0.4}O_2$ | LFP | 1:25 | 1 | 15 | 218.3 | 149.8 | 5818 |
| Example 4 | $Li_2Cu_{0.6}Ni_{0.4}O_2$ | LFP | 1:20 | 1 | 15 | 220.8 | 151.2 | 5915 |
| Example 5 | $Li_2Cu_{0.6}Ni_{0.4}O_2$ | LFP | 1:15 | 1 | 15 | 222.6 | 153.4 | 6025 |
| Example 6 | $Li_2Cu_{0.6}Ni_{0.4}O_2$ | LFP | 1:10 | 1 | 15 | 220.5 | 151.1 | 5930 |
| Example 7 | $Li_2Cu_{0.6}Ni_{0.4}O_2$ | LFP | 1:5 | 1 | 15 | 217.5 | 149.2 | 5810 |
| Example 8 | $Li_2Cu_{0.6}Ni_{0.4}O_2$ | LFP | 1:15 | 0.2 | 15 | 219.5 | 150.3 | 5760 |
| Example 9 | $Li_2Cu_{0.6}Ni_{0.4}O_2$ | LFP | 1:15 | 0.5 | 15 | 220.7 | 151.5 | 5840 |
| Example 10 | $Li_2Cu_{0.6}Ni_{0.4}O_2$ | LFP | 1:15 | 1.5 | 5 | 220.3 | 151.0 | 5875 |
| Example 11 | $Li_2Cu_{0.6}Ni_{0.4}O_2$ | LFP | 1:15 | 2 | 15 | 219.3 | 150.6 | 5735 |
| Example 12 | $Li_2Cu_{0.6}Ni_{0.4}O_2$ | LFP | 1:15 | 3 | 15 | 218.7 | 149.8 | 5650 |
| Example 12 | $Li_2Cu_{0.6}Ni_{0.4}O_2$ | LFP | 1:15 | 3.5 | 15 | 214.5 | 146.2 | 5595 |
| Example 13 | $Li_2Cu_{0.6}Ni_{0.4}O_2$ | LFP | 1:15 | 1 | 5 | 219.4 | 150.1 | 5820 |
| Example 14 | $Li_2Cu_{0.6}Ni_{0.4}O_2$ | LFP | 1:15 | 1 | 10 | 221.3 | 152.3 | 5880 |
| Example 15 | $Li_2Cu_{0.6}Ni_{0.4}O_2$ | LFP | 1:15 | 1 | 20 | 220.9 | 151.9 | 5920 |
| Example 16 | $Li_2Cu_{0.6}Ni_{0.4}O_2$ | LFP | 1:15 | 1 | 25 | 218.9 | 149.5 | 5905 |
| Example 17 | $Li_2Cu_{0.6}Ni_{0.4}O_2$ | LFP | 1:15 | 1 | 30 | 217.1 | 149.0 | 5520 |
| Example 18 | $Li_2Cu_{0.6}Ni_{0.4}O_2$ | LFP | 1:15 | 1 | 35 | 216.3 | 147.5 | 5415 |
| Example 19 | $Li_2Cu_{0.6}Ni_{0.4}O_2$ | LFP | 1:15 | 3.5 | 4 | 215.3 | 147.1 | 5480 |
| Example 20 | $Li_2Cu_{0.6}Ni_{0.4}O_2$ | LFP | 1:4 | 1 | 35 | 213.6 | 145.2 | 5410 |
| Example 21 | $Li_2Cu_{0.6}Ni_{0.4}O_2$ | LFP | 1:4 | 3.5 | 15 | 214.3 | 146.5 | 5400 |
| Example 22 | $Li_6CoO_4$ | LFP | 1:15 | 1 | 15 | 219.8 | 149.3 | 5850 |
| Example 23 | $Li_2CuO_2$ | LFP | 1:15 | 1 | 15 | 221.9 | 150.8 | 5900 |
| Example 24 | $Li_2NiO_2$ | LFP | 1:15 | 1 | 15 | 220.4 | 149.8 | 5895 |
| Example 25 | $Li_5FeO_4$ | LFP | 1:15 | 1 | 15 | 220.1 | 149.6 | 5855 |
| Comparative Example 1 | / | LFP | / | 1 | / | 170.1 | 145.2 | 4100 |
| Comparative Example 2 | $Li_2Cu_{0.6}Ni_{0.4}O_2$ | LFP | 1:15 | 1 | 15 | 180.6 | 146.5 | 4300 |
| Comparative Example 3 | $Li_2Cu_{0.6}Ni_{0.4}O_2/Al_2O_3$ | LFP | 1:15 | 1 | 15 | 190.2 | 147.3 | 4600 |
| Example 26 | $Li_2Cu_{0.6}Ni_{0.4}O_2$ | NCM811 | 1:20 | 5 | 20 | 276.3 | 205.1 | 3100 |
| Example 27 | $Li_6CoO_4$ | NCM811 | 1:20 | 5 | 20 | 276.1 | 204.9 | 2950 |
| Example 28 | $Li_2CuO_2$ | NCM811 | 1:20 | 5 | 20 | 275.4 | 204.5 | 2890 |
| Example 29 | $Li_2NiO_2$ | NCM811 | 1:20 | 5 | 20 | 275.7 | 204.7 | 2930 |
| Example 30 | $Li_5FeO_4$ | NCM811 | 1:20 | 5 | 20 | 275.5 | 204.6 | 2910 |
| Comparative Example 4 | / | NCM811 | / | 5 | / | 220.1 | 198.5 | 2050 |
| Comparative Example 5 | $Li_2Cu_{0.6}Ni_{0.4}O_2$ | NCM811 | 1:20 | 5 | 20 | 235.4 | 199.3 | 2350 |
| Comparative Example 6 | $Li_2Cu_{0.6}Ni_{0.4}O_2/Al_2O_3$ | NCM811 | 1:20 | 5 | 20 | 245.5 | 201.2 | 2500 |

Note: Unless otherwise specified, a mass ratio in Table 1 is a mass ratio of the positive-electrode pre-lithiation material to the positive-electrode active material.

It can be known from the results of Table 1 that, in the composite positive-electrode material of this application, the lithium-rich metal oxide coats the surface of the positive-electrode active material, so that the secondary battery obtains a higher first-time charging-discharging capacity, energy density, and cycle life.

Because Comparative Examples 1 to 6 do not meet the foregoing conditions, the first-time charging-discharging capacity, energy density, and cycle life of the secondary battery are all relatively low.

It can be seen from the results of Examples 1 to 7 that, when a proportion of the positive-electrode pre-lithiation material and the positive-electrode active material falls within an appropriate range, the energy density and cycle life of the secondary battery can be further improved.

It can be seen from the results of Examples 5 and 8 to 18, when the particle size distribution of the positive-electrode pre-lithiation material or positive-electrode active material falls within an appropriate range, the energy density and cycle life of the secondary battery can be further improved.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A composite positive-electrode material, comprising a core and a coating layer covering at least part of a surface of the core, wherein:
   the core comprises a positive-electrode pre-lithiation material, the positive-electrode pre-lithiation material comprises a lithium-rich metal oxide, and the coating layer comprises a positive-electrode active material;
   a charging cut-off voltage of the positive-electrode active material is 3.5V-4.2V (vs. Li/Li$^+$), and the lithium-rich metal oxide is selected from one or more of $Li_5FeO_4$, $Li_2CuO_2$, $Li_2Cu_{x1}Ni_{1-x1-y1}M_{y1}O_2$, and $Li_2MnO_2$, wherein 0<x1<1, 0≤y1<0.1, M is selected from one or more of Zn, Sn, Mg, Fe, and Mn; and the positive-electrode active material is selected from one or more of $LiFePO_4$, $Li_3V_2(PO_4)_3$ and $LiFe_yMn_{1-y}PO_4$, wherein $0<y<1$.

2. The composite positive-electrode material according to claim 1, wherein, in the composite positive-electrode material, the positive-electrode active material is distributed on the surface of the core in a form of independent particles; and
a mass ratio of the positive-electrode pre-lithiation material to the positive-electrode active material is 1:2-1:35.

3. The composite positive-electrode material according to claim 1, wherein a median particle size $D_v50$ of the positive-electrode pre-lithiation material is 2 μm-35 μm.

4. The composite positive-electrode material according to claim 1, wherein a median particle size $D_v50$ of the positive-electrode active material is 0.1 μm-15 μm.

5. The composite positive-electrode material according to claim 1, wherein
a valence state of each metal element other than Li in the lithium-rich metal oxide is lower than its own highest oxidation valence state.

6. The composite positive-electrode material according to claim 1, wherein the median particle size $D_v50$ of the positive-electrode active material is 1 μm-15 μm. .

7. The composite positive-electrode material according to claim 1, wherein the median particle size $D_v50$ of the positive-electrode active material is 0.1 μm-3.5 μm.

8. A positive-electrode plate, comprising a positive-electrode current collector and a positive-electrode film layer disposed on the positive-electrode current collector, wherein the positive-electrode film layer comprises the composite positive-electrode material according to claim 1.

9. The positive-electrode plate according to claim 8, wherein the positive-electrode film layer further comprises a conductive agent and a binder; and based on a total weight of the positive-electrode film layer, the positive-electrode film layer comprises 70 wt %-97 wt % of the composite positive-electrode material, 2 wt %-20 wt % of a conductive agent, and 1 wt %-25 wt % of a binder.

10. A secondary battery, comprising the positive-electrode plate according to claim 8.

11. A preparation method of a composite positive-electrode material, comprising the following steps:
providing a core, wherein the core comprises a positive-electrode pre-lithiation material, the positive-electrode pre-lithiation material comprises a lithium-rich metal oxide, and the lithium-rich metal oxide is selected from one or more of $Li_5FeO_4$, $Li_2CuO_2$, $Li_2Cu_{x1}Ni_{1-x1-y1}M_{y1}O_2$, and $Li_2MnO_2$, wherein $0<x1<1$, $0 \leq y1<0.1$, M is selected from one or more of Zn, Sn, Mg, Fe, and Mn;
providing a coating material, wherein the coating material comprises a positive-electrode active material, a charging cut-off voltage of the positive-electrode active material is 3.5 V-4.2 V (vs. Li/Li$^+$), and the positive-electrode active material is selected from one or more of $LiFePO_4$, $Li_3V_2(PO_4)_3$ and $LiFe_yMn_{1-y}PO_4$, wherein $0<y<1$; and
coating at least part of a surface of the core by using the coating material to obtain a composite positive-electrode material.

\* \* \* \* \*